J. H. PHILLIPS, Jr.
JOINT MEMBER FOR FLEXIBLE PIPE JOINTS.
APPLICATION FILED JUNE 15, 1912.
1,117,961. Patented Nov. 17, 1914.
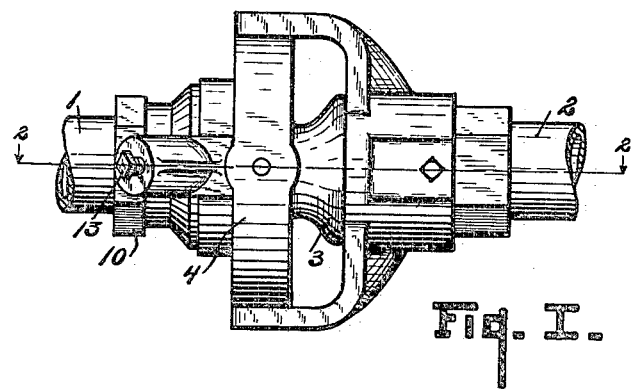
Fig. I.
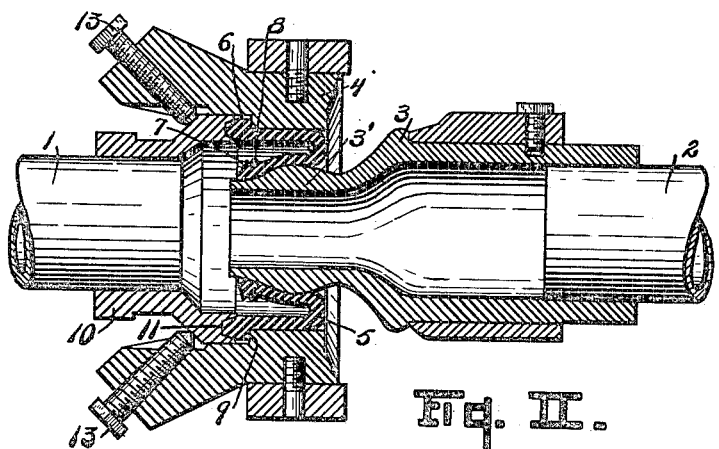
Fig. II.
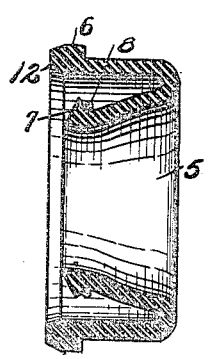
Fig. III.
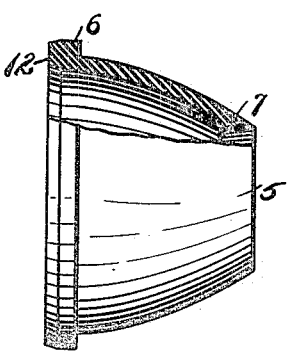
Fig. IV.
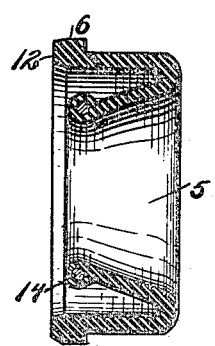
Fig. V.

UNITED STATES PATENT OFFICE.

JOHN HENRY PHILLIPS, JR., OF JACKSON, MICHIGAN, ASSIGNOR TO PHILLIPS METALLIC HOSE CO., OF JACKSON, MICHIGAN.

JOINT MEMBER FOR FLEXIBLE PIPE-JOINTS.

1,117,961.  Specification of Letters Patent.  Patented Nov. 17, 1914.

Original application filed October 18, 1910, Serial No. 587,661. Divided and this application filed June 15, 1912. Serial No. 703,837.

*To all whom it may concern:*

Be it known that I, JOHN H. PHILLIPS, Jr., a citizen of the United States, residing at the city of Jackson, county of Jackson, and State of Michigan, have invented certain new and useful Improvements in Joint Members for Flexible Pipe-Joints, of which the following is a specification.

This invention relates to improvements in joint members for flexible pipe joints.

My improved joint member is especially designed by me for use in my improved universal pipe joint illustrated and described in my application for Letters Patent No. 587,661, filed Oct. 18, 1910, this application being a divisional application.

The main object of this invention is, to provide an improved joint member for universal pipe couplings.

Further objects, and objects relating to structural details, will definitely appear from the detailed description to follow.

I accomplish the objects of my invention by the devices and means described in the following specification.

The invention is clearly defined and pointed out in the claims.

A structure which is a preferred embodiment of my invention is clearly illustrated in the accompanying drawing, forming a part of this specification, in which:

Figure I is a side elevation of a structure embodying the features of my invention, the pipe to which the couplings are attached being broken away. Fig. II is a longitudinal section through the joint taken on a line corresponding to line 2—2 of Fig. I. Fig. III is a longitudinal section of my improved joint member. Fig. IV is a detail view partially in longitudinal section of my improved joint member as it comes from the mold. Fig. V is a longitudinal central section of a modified form of my improved joint member.

In the drawing, similar reference characters refer to similar parts throughout the several views.

Referring to the drawing, 1 and 2 represent the pipes coupled.

I provide a male coupling member 3 and a female coupling member 4, the male coupling member having nipple 3' projecting into the socket of the female member. The male and female members are supported in their coacting relation by a universal joint connection so that the male member swings freely in the female member. As the structural details of this universal joint coupling form no part of my present invention, I do not describe the same herein. The structure is fully described in my application for patent referred to of which this is a division.

The annular joint member 5 is, when in position in the joint, substantially U-shaped in cross section. The joint member 5 is formed of rubber or other flexible material suitable for the purpose.

The member 5 as it comes from the mold is shown in Fig. IV. In this condition the member is tapered toward one end, the taper being on a curve. At its large end, the member 5 is provided with an outwardly projecting annular shoulder-like flange 6. At its inner end, it is provided with an internal annular shoulder-like flange 7. The small end is turned inwardly into the large end and the flange 7 then becomes an external flange for the small end. See Fig. III. After the small end is turned inwardly, a supporting ring 8 is arranged thereon at the rear of the flange 7. This prevents expansion of the inner end of the member and also retains it in its adjusted position.

The taper is sufficient so that there is a substantial annular space between the inner and outer portions of the member after it is turned inwardly upon itself as shown in Fig. III.

In assembling the joint, the outer cylindrical portion is slipped into the female member 4 of the coupling with its flange 7 against the shoulder 9 thereof. The pipe coupling member 10 is provided with an annular groove 11 in its inner end adapted to receive the beveled end 12 of the joint member 5. The coupling member 10 is clamped in position by means of the screws 13. This clamps the flange 6 against the shoulder 9. The inner tapered portion of the joint member is sleeved upon the nipple 5 of the male coupling member, as shown in Fig. II.

The supporting ring 8 prevents the expansion of the inner portion of the coupling member and also prevents its drawing over the male member or being blown over the same by the pressure within the pipe.

In the modified structure shown in Fig. V, a supporting ring 14 is embedded in the inner end of the inner portion. The form shown in detail in Figs. III and IV is however preferred on account of manufacturing advantages as the structure shown in Fig. V cannot be molded in the conical form shown in Fig. IV and then conveniently turned.

With the parts thus arranged, the wear upon the joint member is minimized as it flexes freely and without serious cramping or binding action thereon. It is not exposed to any frictional wear in the manner of an ordinary packing ring in a ball and socket joint. Further, I secure the advantages of a universal joint coupling without accurate fitting of parts and wear resulting from friction of parts.

Having thus described my invention, what I claim as new and desire to secure by Letters Patent is:

1. A flexible annular joint member consisting of a cylindrical outer portion terminating in an outwardly projecting shoulder-like annular flange; an inturned tapered inner portion terminating in an outwardly projecting annular flange, there being a space between the outer and inner portions to permit movement of the inner within the outer; and a supporting ring closely embracing the inner portion at the rear of said flange and retained thereby.

2. A flexible annular tapered joint member provided with an external annular flange at its large end and an internal annular flange at its small end, its small end being adapted to be turned inwardly into its large end in which position the flange on the small end is external, and a supporting ring embracing the inturned small end at the rear of said flange and retained thereby.

3. A flexible annular tapered joint member provided with an internal annular flange at its small end, its small end being adapted to be turned inwardly into its large end in which position the flange on the small end is external, and a supporting ring embracing the inturned small end at the rear of said flange and retained thereby.

4. A flexible annular tapered joint member provided with an external annular flange at its large end, the small end of said joint member being adapted to be turned inwardly into its large end, and means for preventing the expansion of the small end.

5. A flexible annular tapered joint member, the small end of said joint member being adapted to be turned inwardly into its large end, and means for preventing the expansion of the small end.

6. A flexible annular joint member consisting of a cylindrical outer portion; an inturned tapered inner portion, there being a space between the outer and inner portions to permit movement of the inner within the outer; and a supporting ring for the inner end of the inner portion.

In witness whereof, I have hereunto set my hand and seal in the presence of two witnesses.

JOHN HENRY PHILLIPS, Jr. [L. S.]

Witnesses:
NATHAN E. BAILEY,
M. GRONEFFATES.